United States Patent
Lavignotte et al.

(10) Patent No.: US 12,345,418 B2
(45) Date of Patent: Jul. 1, 2025

(54) METHOD FOR MANUFACTURING A FLAME TUBE FOR A TURBOMACHINE

(71) Applicant: SAFRAN HELICOPTER ENGINES, Bordes (FR)

(72) Inventors: Stéphane Lavignotte, Moissy-Cramayel (FR); Guillaume Thierry Cottin, Moissy-Cramayel (FR); Jean-Paul Didier Autret, Moissy-Cramayel (FR); Mehdi Deliba, Moissy-Cramayel (FR); Thomas Sebastien Alexandre Gresy, Moissy-Cramayel (FR); Nicolas Roland Guy Savary, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 558 days.

(21) Appl. No.: 17/616,280

(22) PCT Filed: Jun. 3, 2020

(86) PCT No.: PCT/FR2020/050940
§ 371 (c)(1),
(2) Date: Dec. 3, 2021

(87) PCT Pub. No.: WO2020/245537
PCT Pub. Date: Dec. 10, 2020

(65) Prior Publication Data
US 2022/0252268 A1    Aug. 11, 2022

(30) Foreign Application Priority Data

Jun. 7, 2019  (FR) .................................... 1906073
Jun. 7, 2019  (FR) .................................... 1906074

(51) Int. Cl.
*F23R 3/44*   (2006.01)
*B22F 10/28*  (2021.01)
(Continued)

(52) U.S. Cl.
CPC ............... *F23R 3/44* (2013.01); *B22F 10/28* (2021.01); *B23K 26/342* (2015.10); *B33Y 10/00* (2014.12);
(Continued)

(58) Field of Classification Search
CPC ...... F23R 3/44; F23R 3/54; F23R 3/42; F23R 3/50; F23R 2900/00018; F23R 3/00; F23R 3/002; F23R 3/005
See application file for complete search history.

(56) References Cited

U.S. PATENT DOCUMENTS 3,360,929 A * 1/1968 Drewry .................. F23R 3/286
                                                  432/223
3,719,046 A * 3/1973 Sutherland ................ F02K 9/68
                                                   60/206

(Continued)

FOREIGN PATENT DOCUMENTS

CN     113175688 A  *  7/2021 ................ F23R 3/42
DE  102017216595 A1     3/2019

(Continued)

OTHER PUBLICATIONS

Written Opinion of the International Searching Authority mailed Oct. 1, 2020, issued in corresponding International Application No. PCT/FR2020/050940, filed Jun. 3, 2020, 5 pages.
(Continued)

*Primary Examiner* — Craig Kim
(74) *Attorney, Agent, or Firm* — Christensen O'Connor Johnson Kindness PLLC (57) ABSTRACT

A method for manufacturing a flame tube for a turbomachine, the flame tube extending about an axis and comprising an annular radially internal wall and an annular radially external wall, connected to each other by an end wall or head wall, the internal wall, the external wall and the end wall
(Continued)

defining an internal volume, at least one part of the said end wall forming a double wall comprising a first part and a second part connected to each other and spaced apart from each other so as to delimit a flow channel for a flow of cooling air opening into the said internal volume, the said flow channel comprising at least one air-inlet opening, the first and second parts of the double wall being connected by connecting zones or bridges extending into the flow channel for the cooling-air flow, the flame tube being manufactured by additive manufacturing.

12 Claims, 7 Drawing Sheets

(51) Int. Cl.
*B23K 26/342* (2014.01)
*B33Y 10/00* (2015.01)
*B23K 101/00* (2006.01)

(52) U.S. Cl.
CPC ..... *B22F 2301/15* (2013.01); *B23K 2101/001* (2018.08); *F23R 2900/03043* (2013.01)

(56) References Cited

U.S. PATENT DOCUMENTS

| | | | | |
|---|---|---|---|---|
| 3,735,806 A * | 5/1973 | Kirkpatrick | ............... | E04B 1/80 |
| | | | | 165/104.14 |
| 4,104,874 A * | 8/1978 | Caruel | ................... | F23R 3/002 |
| | | | | 431/351 |
| 4,896,510 A * | 1/1990 | Foltz | ...................... | F23R 3/002 |
| | | | | 60/757 |
| 7,043,921 B2 * | 5/2006 | Hadder | .................. | F23R 3/005 |
| | | | | 60/752 |
| 9,377,198 B2 * | 6/2016 | Eastwood | ................. | F23R 3/10 |
| 9,989,260 B2 * | 6/2018 | Hughes | .................... | F02C 3/04 |
| 10,712,006 B2 * | 7/2020 | Clemen | .................. | F23R 3/002 |
| 10,982,852 B2 * | 4/2021 | Sauer | ........................ | F23R 3/04 |
| 11,073,282 B2 * | 7/2021 | Ryon | ......................... | F23R 3/50 |
| 2003/0061815 A1 * | 4/2003 | Young | ........................ | B23P 6/00 |
| | | | | 60/752 |
| 2008/0066468 A1 * | 3/2008 | Faulder | ................... | F23R 3/283 |
| | | | | 60/737 |
| 2016/0025006 A1 * | 1/2016 | Propheter-Hinckley | ..................... | |
| | | | | F02C 7/08 |
| | | | | 165/51 |
| 2018/0163964 A1 | 6/2018 | Heinze | | |
| 2019/0063751 A1 * | 2/2019 | Ryon | ...................... | F28D 15/04 |
| 2019/0086081 A1 * | 3/2019 | Bellardi | .................. | F23R 3/002 |
| 2019/0128523 A1 * | 5/2019 | Sze | .......................... | F23R 3/005 |
| 2020/0063961 A1 * | 2/2020 | Jones | ........................ | F23R 3/60 |
| 2020/0063963 A1 * | 2/2020 | Bilse | ......................... | F23R 3/10 |
| 2022/0252268 A1 * | 8/2022 | Lavignotte | ................. | F23R 3/44 |

FOREIGN PATENT DOCUMENTS

| | | | | |
|---|---|---|---|---|
| EP | 0724119 A2 | 7/1996 | | |
| EP | 3073196 A1 | 9/2016 | | |
| EP | 3144485 A1 | 3/2017 | | |
| EP | 3447382 A1 | 2/2019 | | |
| EP | 3980692 A1 * | 4/2022 | .............. | B22F 10/28 |
| FR | 2996289 A1 | 4/2014 | | |
| FR | 3030323 A1 | 6/2016 | | |
| FR | 3097028 A1 * | 12/2020 | .............. | B22F 10/28 |
| FR | 3097029 A1 * | 12/2020 | .............. | B22F 10/28 |
| WO | WO-2018144008 A1 * | 8/2018 | .............. | F23R 3/002 |
| WO | WO-2020245537 A1 * | 12/2020 | .............. | B22F 10/28 |

OTHER PUBLICATIONS

International Preliminary Report of Patentability mailed Dec. 7, 2021, issued in corresponding International Application No. PCT/FR2020/050940, filed Jun. 3, 2020, 1 page.
International Search Report mailed Oct. 1, 2020, issued in corresponding International Application No. PCT/FR2020/050940, filed Jun. 3, 2020, 3 pages.
Written Opinion of the International Searching Authority mailed Oct. 1, 2020, issued in corresponding International Application No. PCT/FR2020/050940, filed Jun. 3, 2020, 6 pages.

* cited by examiner

METHOD FOR MANUFACTURING A FLAME TUBE FOR A TURBOMACHINE

CROSS-REFERENCES TO RELATED APPLICATIONS

This application is a National Stage of International Application No. PCT/FR2020/050940, filed Jun. 3, 2020, which claims priority to French Patent Application No. 1906073, filed Jun. 7, 2019, and French Patent Application No. 1906074, filed Jun. 7, 2019, the entire disclosures of which are hereby incorporated by reference.

TECHNICAL FIELD

Embodiments of the disclosure relate to a method for manufacturing a flame tube for a turbomachine, in particular for a helicopter or an aircraft.

BACKGROUND

A turbomachine typically comprises, from upstream to downstream in the direction of gas flow within the turbomachine, a fan, one or more compressor stages, for example a low-pressure compressor and a high-pressure compressor, a combustion chamber, one or more turbine stages, for example a high-pressure turbine and a low-pressure turbine, and a gas exhaust nozzle.

The combustion chamber is delimited by coaxial internal and external revolution casings connected upstream to a chamber-bottom annular casing. The external casing of the chamber is fixed to an external shell of the turbomachine, the internal casing of the chamber being fixed to an internal shell or connected to the external casing.

The combustion chamber also comprises a flame tube or furnace, which is the seat of the combustion of the gases.

The flame tube can be toroidal and direct flow. In this case, it comprises annular walls joined at an upstream end by a bottom wall or an end wall and a fairing comprising orifices for the passage of fuel injectors mounted on the combustion chamber.

Alternatively, the flame tube can be reverse flow and have an angled annular shape allowing the gas flow to be returned downstream of the turbomachine, towards the turbine. The gas flow is then successively from downstream to upstream and then back to downstream of the combustion chamber. In this case, the injectors are generally mounted at an end or head surface of the flame tube.

A reverse flow flame tube is known in particular from FR 2 996 289. A flame tube is generally formed of several parts obtained from pressed metal sheets, then assembled together. These parts are also subjected to machining operations, in particular drilling.

Such a manufacturing method is relatively long and costly to implement and does not allow for easy modification of the geometry of the stamped parts. Indeed, such modifications require the replacement of the stamping dies, which is particularly expensive.

In addition, the end wall is subject to high thermal stresses, which must be reduced to prevent premature damage to the flame tube.

The disclosure aims to provide a simple, reliable and inexpensive solution to these problems.

SUMMARY

To this end, embodiments of the disclosure relate to a method for manufacturing a flame tube for a turbomachine, the flame tube extending around an axis and comprising a radially inner annular wall and a radially outer annular wall, connected to each other by an end wall or head wall, the inner wall, the outer wall and the end wall defining an internal volume, at least part of the end wall forming a double wall comprising a first part and a second part connected to each other and spaced apart so as to delimit a flow channel for a flow of cooling air opening into the internal volume, the flow channel comprising at least one air inlet opening, the first and second parts of the double wall being connected by connecting zones or bridges extending into the flow channel for the cooling air flow, the flame tube being manufactured by additive manufacturing.

Such a method makes it possible to produce a flame tube of complex structure in a single piece, without requiring numerous and costly additional machining or assembly steps, so as to obtain directly a finished or almost finished flame tube, ready to be used in the turbomachine.

The presence of the double wall and the air circulation channel allows the second part of the double wall to be cooled, so as to limit the risks of damage to the end wall.

The connecting areas or bridges ensure the mechanical strength of the double wall, calibrate the passage cross-section of the corresponding channel and/or allow the second part of the double wall to be manufactured.

The flame tube can be integral, that is to say, made of one piece.

In addition to a cutting or deburring operation, for example, the flame tube can be manufactured without a reworking operation.

The flame tube can be made by sintering or selective melting of powder, for example by means of a laser or electron beam.

Such a method generally comprises a step during which a first layer of powder of a metal, metal alloy or ceramic of controlled thickness is deposited on a manufacturing plate, then a step consisting of heating with a heating means (a laser beam or an electron beam) a predefined area of the layer of powder, and proceeding by repeating these steps for each additional layer, until the final part is obtained, slice by slice. A tooling and a method for manufacturing a part by selective melting or selective sintering of powder are for example described in the French patent application FR 3 030 323 in the name of the Applicant.

At least one connecting area or bridge can comprise at least one frustoconical area or flared area.

The frustoconical area or flared area can flare from the first part to the second part of the double wall.

At least one connecting area or bridge can comprise at least a first conical area or flared area on the first portion side and a second conical area or flared area on the second portion side, the second conical area or flared area having a larger flare angle than the flare angle of the first conical area or flared area.

The flare angle can be defined as the angle of the cone of the corresponding frustoconical area, for example. The second frustoconical area or flared area is thus more flared than the first frustoconical area or flared area.

The connecting areas or bridges can be arranged in at least one circumferentially extending row.

The connecting areas or bridges can be evenly distributed along the row, on the circumference.

The connecting areas or bridges can be arranged in the form of a plurality of rows each extending in the circumferential direction and offset from each other in the radial and/or axial direction.

The first part of the double wall can comprise multi-perforations opening into the cooling-air flow channel, the multi-perforations forming air-inlet openings.

The flame tube can be manufactured by stacking layers, the stacking direction of the layers being parallel to the axis of the flame tube.

The flame tube can be made of a cobalt-based or nickel-based alloy.

Embodiments of the present disclosure also relate to a method for manufacturing a flame tube for a turbomachine, the flame tube extending about an axis and comprising a radially internal annular wall and a radially external annular wall, connected to each other by an end wall or head wall, the internal wall, the external wall and the end wall defining an internal volume, characterized in that at least part of the end wall forming a double wall comprising a first part and a second part connected to each other and spaced apart so as to delimit a flow channel for a flow of cooling air opening into the internal volume, the flow channel comprising at least one air-inlet opening, the flame tube being manufactured integrally, that is to say, as one piece, by additive manufacturing.

The terms "axial", "radial" and "circumferential" are defined in relation to the axis of revolution of the flame tube.

Such a method makes it possible to produce a flame tube of complex structure in a single piece, without requiring numerous and costly additional machining or assembly steps, so as to obtain directly a finished or almost finished flame tube, ready to be used in the turbomachine.

In addition to a cutting or deburring operation, for example, the flame tube can be manufactured without a reworking operation.

The presence of the double wall and the air circulation channel allows the second part of the double wall to be cooled, so as to limit the risks of damage to the end wall. The flame tube can be made by sintering or selective melting of powder, for example by means of a laser or electron beam.

Such a method generally comprises a step during which a first layer of powder of a metal, metal alloy or ceramic of controlled thickness is deposited on a manufacturing plate, then a step consisting of heating with a heating means (a laser beam or an electron beam) a predefined zone of the layer of powder, and proceeding by repeating these steps for each additional layer, until the final part is obtained, slice by slice. A tooling and a method for manufacturing a part by selective melting or selective sintering of powder are for example described in the French patent application FR 3 030 323 in the name of the Applicant.

The flame tube can be manufactured by stacking layers, the stacking direction of the layers being parallel to the axis of the flame tube.

The flame tube can be made of a nickel-based or cobalt-based alloy.

The second part of the double wall can be located on the side of the internal volume of the flame tube, the second part comprising a first end connected to the first part of the double wall and a second free end at which the cooling-air flow channel opens into the internal volume.

The second end can be the radially internal end of the second portion of the double wall.

The first and second parts of the double wall can be connected by connecting areas or bridges extending into the cooling-air flow channel.

The connecting areas or bridges ensure the mechanical strength of the double wall and/or calibrate the passage cross-section of the corresponding channel and guarantee the manufacturability of this double wall.

The connecting areas or bridges may extend parallel to the direction of stacking of the layers.

The first part of the double wall can comprise multi-perforations opening into the cooling-air flow channel, the multi-perforations forming air-inlet openings.

The flame tube can have an air flow guide wall which, together with the end wall, delimits a cooling air guide channel, which channel opens into the internal space parallel to the end wall, the air guide channel having at least one air-inlet opening.

In particular, the air-guiding channel can comprise multiple perforations forming a multitude of air inlets.

The guide wall can be connected to the end wall via connecting areas or bridges extending into the corresponding channel.

The radially internal wall and/or the radially external wall can comprise a fastening flange, located opposite the end wall.

The internal and/or external walls may have multiple perforations, for example obtained by crude means.

At least one of the flanges can comprise multi-perforations in the vicinity of the connecting area between the flange and the corresponding internal or external wall.

At least one of the flanges may have cooling fins extending through the corresponding multi-perforations.

These fins and multi-perforations allow the cooling of the corresponding flange to be promoted.

The fins and openings can be evenly distributed around the circumference.

At least one of the or each of the multi-perforations can comprise a section having a square, rectangular or diamond shaped area and a triangular shaped area.

The radially external wall can comprise an opening for mounting a fuel injector.

The method can comprise a step of mounting a bushing in the opening for mounting the injector.

The bushing can be mounted by turning or crimping.

The bushing may have a machined internal diameter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
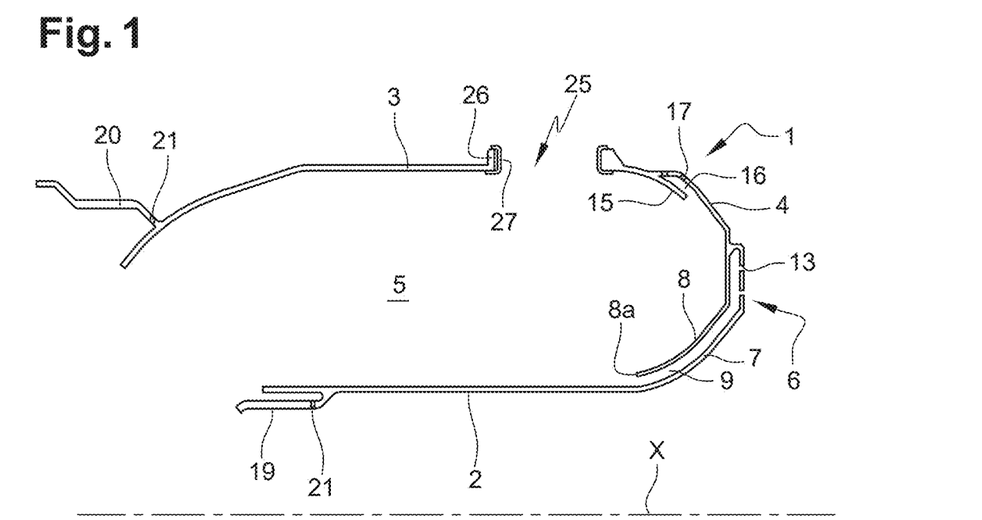
FIG. 1 is a cross-sectional half-view of a flame tube manufactured by the method according to the disclosure.
Figure 2:
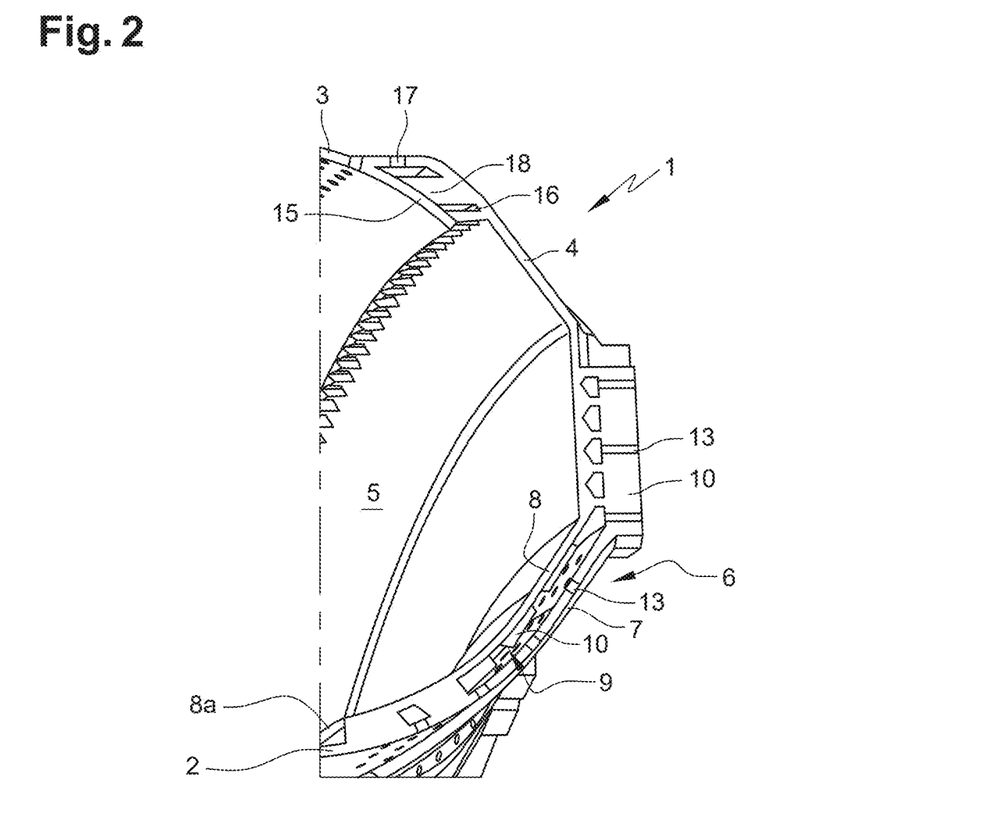
FIG. 2 is a cross-sectional and perspective view of a portion of the flame tube of FIG. 1.
Figure 3:
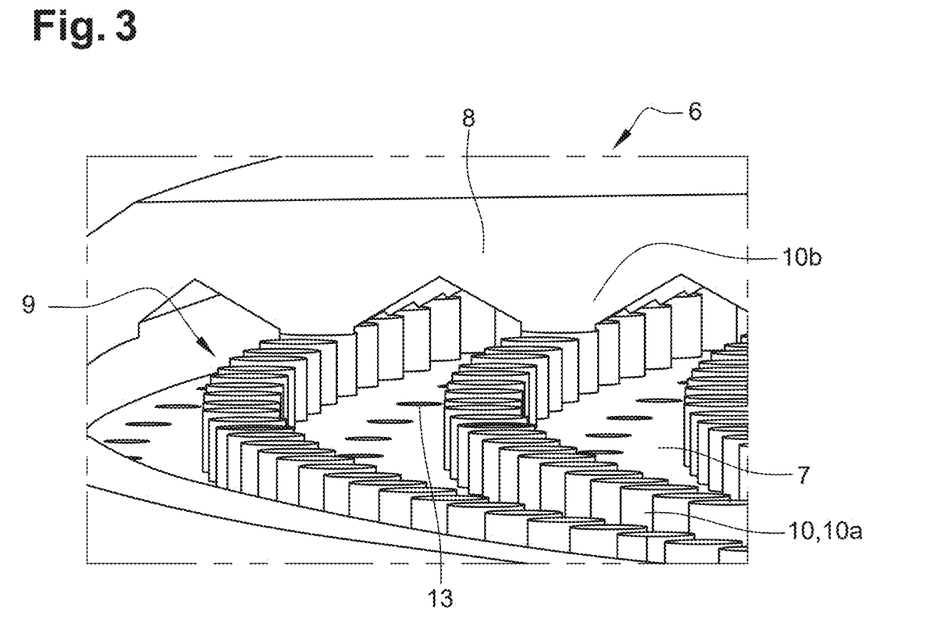
FIG. 3 is a perspective view, in detail, illustrating one embodiment of the double wall.
Figure 4:
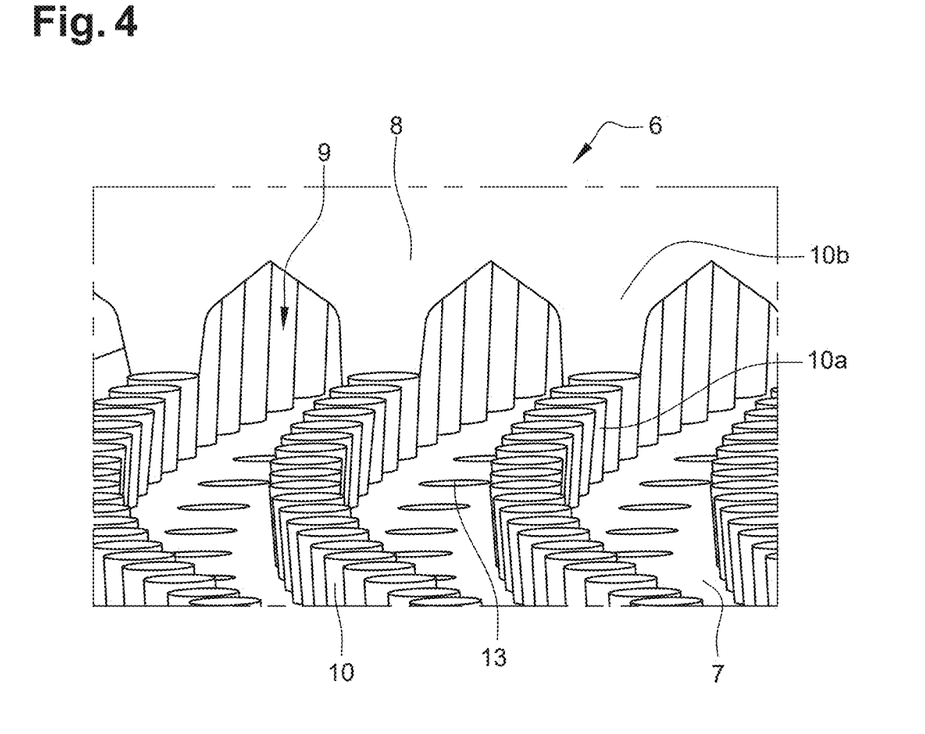
FIG. 4 is a perspective view, in detail, illustrating another embodiment of the double wall.
Figure 5:
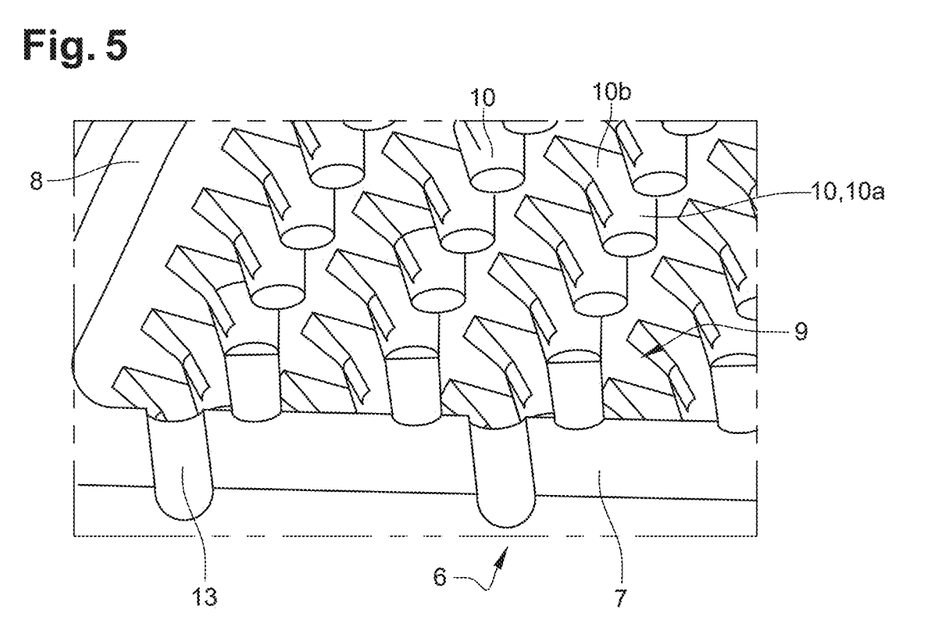
FIG. 5 is a perspective view, in detail and with partial tear-off, illustrating the double wall of FIG. 4.
Figure 6:
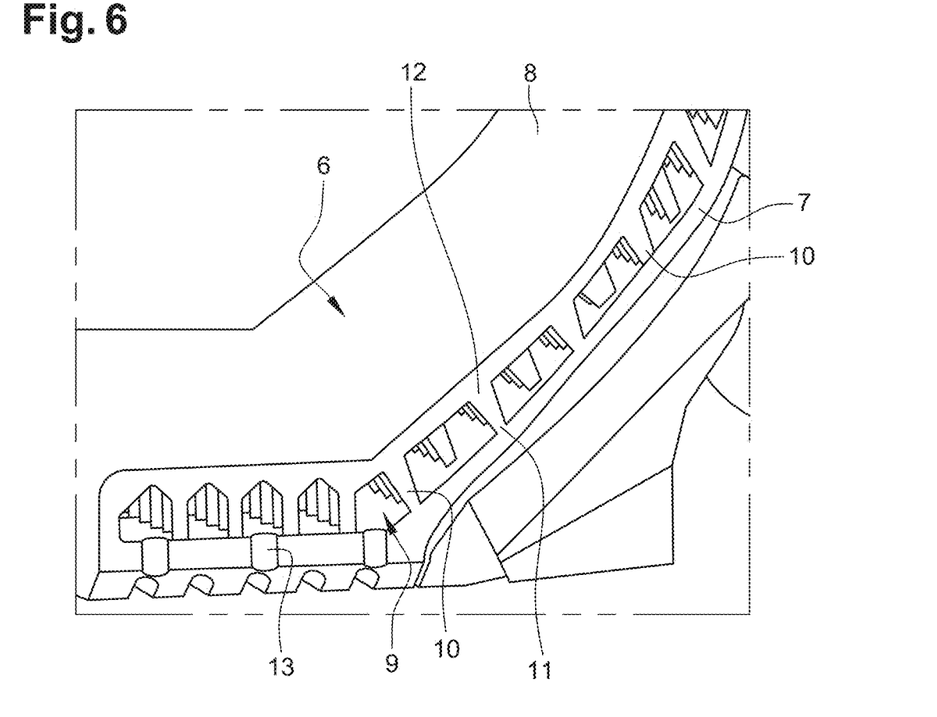
FIG. 6 is a cross-sectional view of the double wall of FIGS. 4 and 5.
Figure 7:
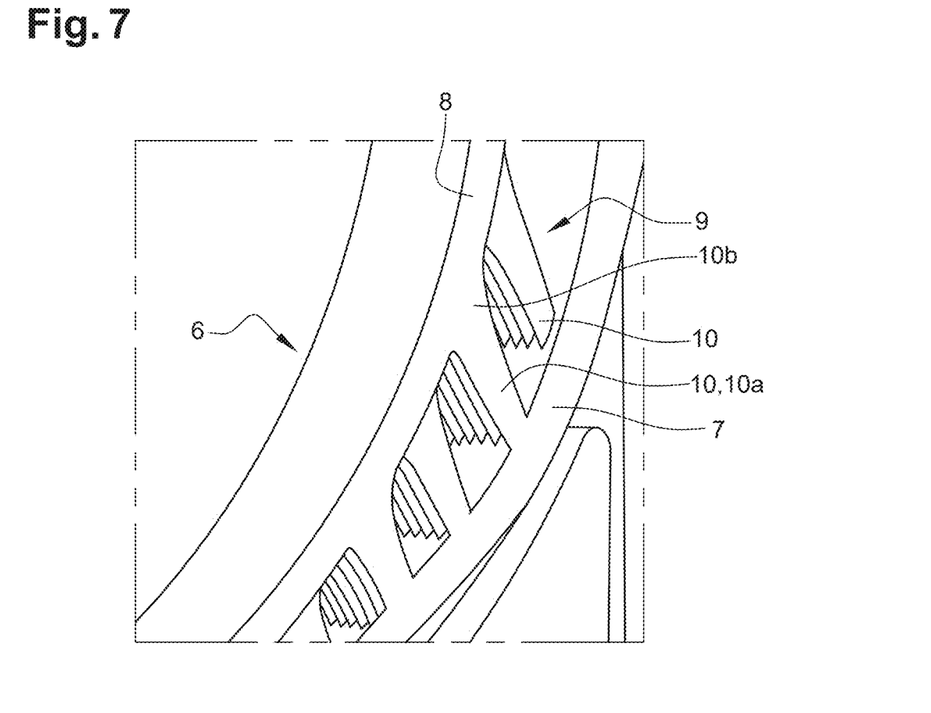
FIG. 7 is a cross-sectional view illustrating a double wall according to another embodiment of the disclosure.

FIGS. 1 and 2 illustrate a flame tube 1 obtained using the manufacturing method according to the disclosure. The flame tube 1 is annular and extends around an axis X. The flame tube 1 is made of one piece and comprises a radially internal annular wall 2 and a radially external annular wall 3, connected to each other by an end wall or head wall 4, the internal wall 2, the external wall 3 and the end wall 4 defining an internal volume 5.

A part of the end wall 4 forms a double wall 6 comprising a first portion 7 and a second part 8 connected to each other and spaced apart from each other so as to delimit a flow channel 9 for a flow of cooling air opening into the internal volume 5.

The second part 8 of the double wall 6 is located on the side of the internal volume 5 of the flame tube 1. The second part 8 comprises a first, radially external end connected to the first part 7 of the double wall 6 and a second, radially internal, free end 8a at which the cooling-air flow channel 9 opens into the internal volume 5.

The first and second parts 7, 8 of the double wall 6 are connected by connecting areas or bridges 10 extending into the flow channel 9.

As is better seen in FIGS. 3 to 7, each bridge 10 extends along an axis and has a first end 11 (FIG. 6) connected to the first part 7 of the double wall 6 and a second end 12 connected to the second part 8 of the double wall 6. Each bridge 11 has a generally flared shape, here towards the second part 8.

In the embodiments shown in FIGS. 3 to 7, each bridge 10 comprises a first frustoconical area 10a located on the side of the first part 7 and a second frustoconical area 10b located on the side of the second part 8. The second frustoconical area 10b is more flared than the first frustoconical area 10a. In other words, the cone angle of the second frustoconical area 10b is larger than the cone angle of the first frustoconical area 10a. The bridges 10 can also comprise tapers or rounded areas connecting at least one of the ends 11, 12 to the corresponding part 7, 8 of the double wall 6.

The bridges 10 are arranged in rows, the rows being radially and/or axially offset from each other. The bridges 10 of the same row are regularly distributed over the circumference, around the axis X.

The length of the bridges 10, their diameter and/or their spacing from each other can vary within the double wall 6. Longer bridges 10, having a smaller diameter and/or being spaced further apart from each other, can be located in areas requiring improved airflow within the respective channel, for example.

The flow channel 9 comprises air-inlet openings 13 formed by multi-perforations provided in the first part 7 of the double wall 6. The multi-perforations 13 are regularly distributed along the surface of the first part 7, between the first ends 11 of the bridges 10.

The flame tube 1 further comprises a guide wall 15 for a cooling-air flow, which delimits a cooling air guide channel 16 with the end wall, the channel 16 opening into the internal volume 5 parallel to the end wall 4. The air guide channel 16 also comprises multi-perforations 17 forming air inlets and connecting zones or bridges 18 connecting the guide wall 15 and the end wall 4. The guide channel 16 opens radially inwards and is capable of forming a film of air which licks the end wall 4.

The radially internal wall 2 and the radially external wall 3 also have an internal attachment flange 19 and an external attachment flange 20, respectively, located axially opposite the end wall 4.

Each fastening flange 19, 20 has multi-perforations 21 in the vicinity of the connecting area between the corresponding flange 19, 20 and the corresponding internal or external wall 2, 3.

The external wall 3 further comprises a circular opening 25, surrounded by a rim 26. The opening 25 is intended for the mounting of fuel injection means, not shown. A bushing 27 is mounted by crimping or turning in the opening 25. The internal diameter of the bushing 27 can be obtained by machining.

The flame tube 1 is manufactured integrally, that is to say, as one piece (with the exception of the bushing, which does not belong to the one-piece flame tube), by additive manufacturing, in particular by sintering or selective powder melting, for example with the aid of a laser beam or electron beam.

Such a method comprises a step during which a first layer of powder of a metal or a metal alloy of controlled thickness is deposited on a manufacturing plate, then a step consisting of heating with a heating means (a laser beam or an electron beam) a predefined area of the layer of powder, and proceeding by repeating these steps for each additional layer, until the final part is obtained, slice by slice.

The area of the first part 7 of the double wall 6 can be attached to the plate and then detached, for example by machining, in order to separate the manufactured part 1 from the plate.

A tooling and a method for manufacturing a part by selective melting or selective sintering of powder are for example described in the French patent application FR 3 030 323 in the name of the Applicant.

The one-piece flame tube 1 can thus be manufactured by stacking layers, the stacking direction of the layers being parallel to the X axis of the flame tube 1.

The layers have thicknesses of, for example, 20 to 80 microns.

The flame tube 1 is, for example, made of a cobalt- or nickel-based alloy.

The different areas of the one-piece flame tube 1 preferably have a slight inclination with respect to the stacking axis of the layers. Thus, with the exception of the rim 26 and a part of the end wall 4, the other areas of the flame tube 1 form an angle of less than 60° with the layer stacking direction. Manufacturing supports can be used for the areas with a larger inclination, as is known per se.

Figure 12:
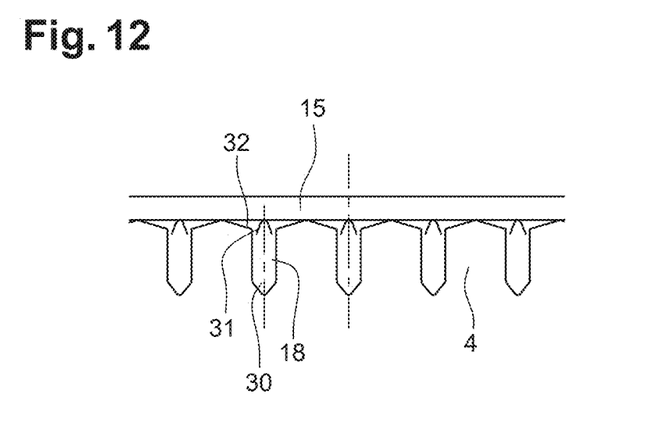
FIG. 12 is a detail view showing the structure of the bridges connecting in particular the guide wall to the end wall.

Each bridge 18 has a first end 30 (FIG. 12) connected to the end wall 4 and a second end 31 connected to the guide wall 15. The second end 31 can comprise a connecting area 32 flaring towards the guide wall 15.

The radially internal wall 2 and the radially external wall 3 also have an internal attachment flange 19 and an external attachment flange 20, respectively, located axially opposite the end wall 4.

Each fastening flange 19, 20 has multi-perforations 21 in the vicinity of the connection area between the corresponding flange 19, 20 and the corresponding internal or external wall 2, 3.

Figure 8:
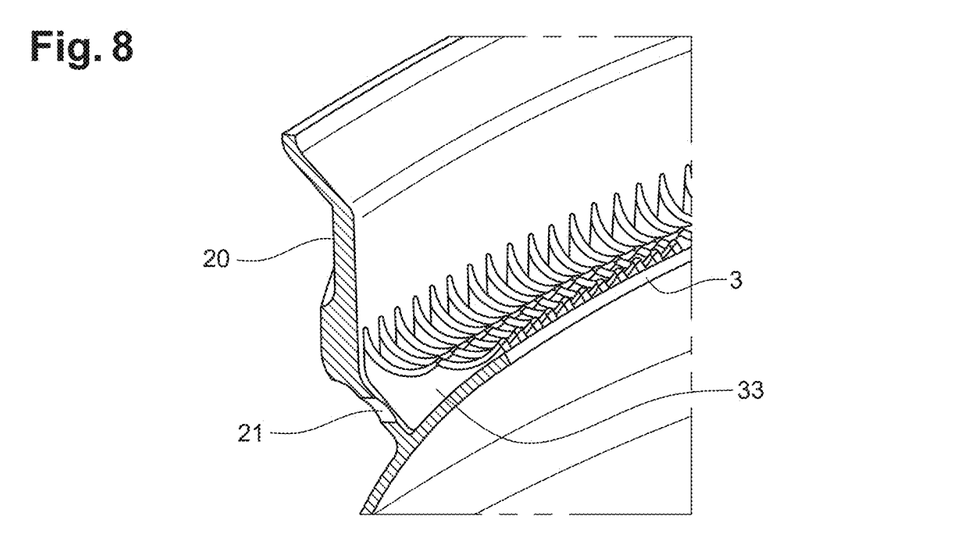
FIG. 8 is a detailed perspective view of another embodiment showing the area of the external wall provided with the external flange.
Figure 9:
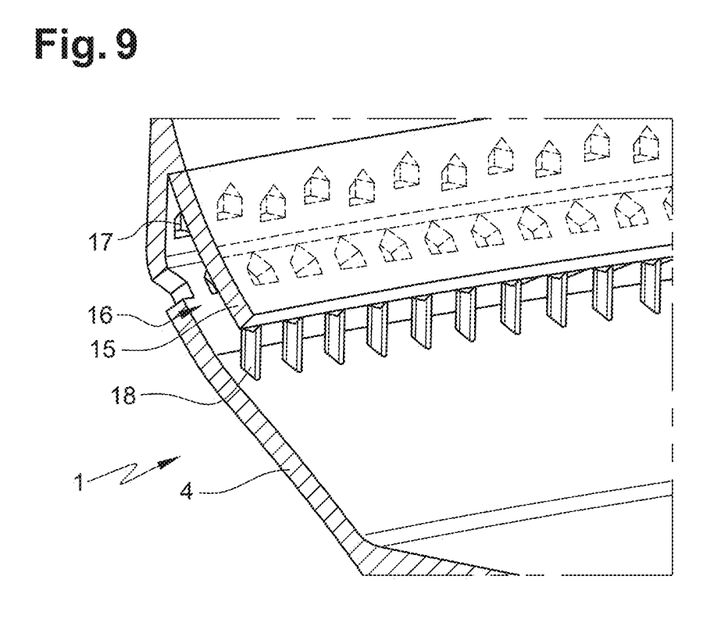
FIG. 9 is a perspective detail showing a portion of the end wall and guide wall of the flame tube.

At least one of the flanges 19, 20, for example the radially external flange 20, comprises cooling fins 33 (FIG. 8) extending at the corresponding multi-perforations 21 between the external flange 20 and the external wall 3. The fins 33 and the multi-perforations 21 serve to promote the cooling of the corresponding flange 20.

Figure 10:
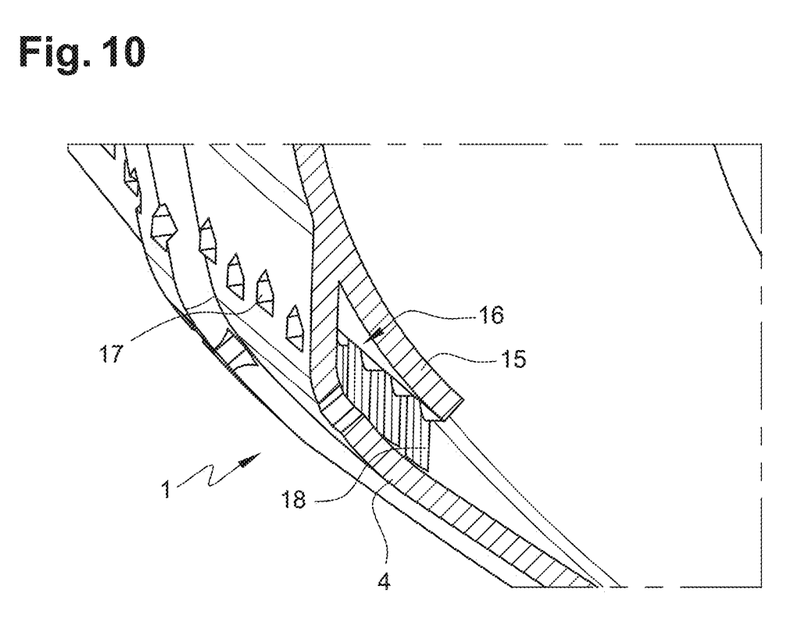
FIG. 10 is a detailed perspective view showing the area of the flame tube provided with the guide wall.
Figure 11:
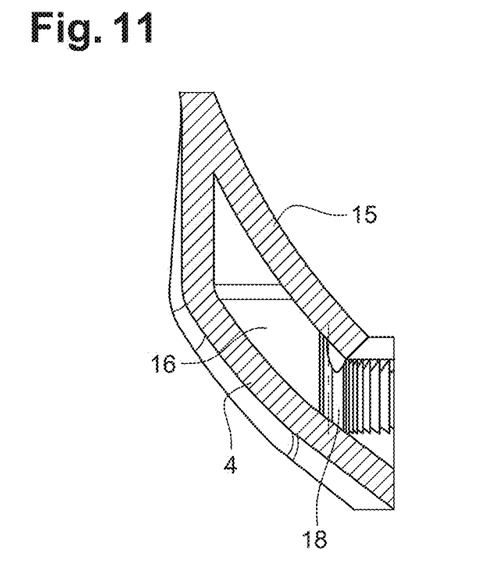
FIG. 11 is a detailed cross-sectional view showing the area of the flame tube provided with the guide wall.

Each multi-perforation 13, 17, 21 can have a cross-section with a square, rectangular or diamond shaped area and a triangular shaped area (FIG. 10).

The external wall 3 further comprises a circular opening 25, surrounded by a rim 26. The opening 25 is intended for mounting fuel injection means and fastening pins, not shown. A bushing 27 is crimped into the opening 25. The internal diameter of the bushing 27 can be obtained by machining.

The flame tube 1 is manufactured integrally, that is to say, as one piece (with the exception of the bushing, which does not belong to the one-piece flame tube), by additive manufacturing, in particular by sintering or selective powder melting, for example with the aid of a laser beam or electron beam.

Such a method comprises a step during which a first layer of powder of a metal or metal alloy of controlled thickness is deposited on a manufacturing plate 34 (FIG. 13), then a step consisting of heating with a heating means (a laser beam or an electron beam) a predefined area of the layer of powder, and proceeding by repeating these steps for each additional layer, until the final part is obtained, slice by slice.

A tooling and a method for manufacturing a part by selective melting or selective sintering of powder are for example described in the French patent application FR 3 030 323 in the name of the Applicant.

Figure 13:
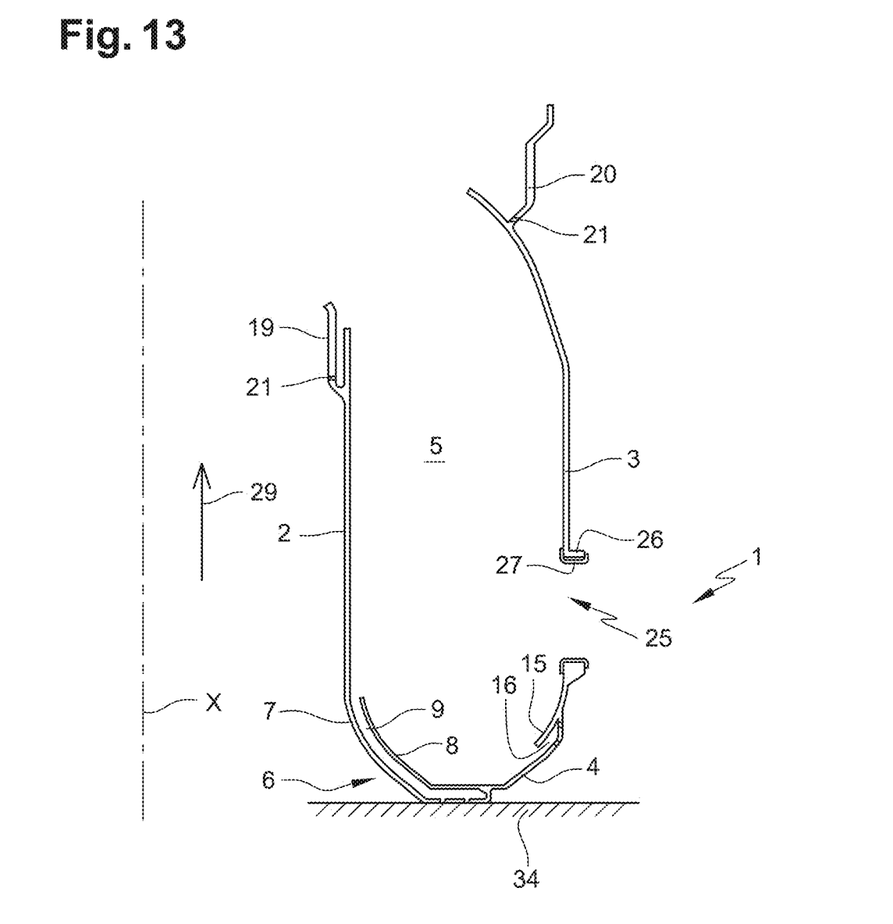
FIG. 13 is a view showing the orientation of the flame tube during its manufacturing by additive manufacturing.

The one-piece flame tube 1 can thus be made by stacking layers, the stacking direction of the layers, illustrated by an arrow 29 in FIG. 13, being parallel to the X-axis of the flame tube 1.

The layers have thicknesses of, for example, 20 to 80 microns.

The flame tube 1 is, for example, made of a nickel-based or cobalt-based alloy.

The different areas of the one-piece flame tube 1 preferably have a slight inclination with respect to the stacking axis of the layers. Thus, with the exception of the rim, part of the end wall 4, the connecting areas and the bridge heads 10 in the double wall 6, the other areas of the flame tube 1 form an angle of less than 60° with the layer stacking direction. Manufacturing supports can be used for the areas with a larger inclination, as is known per se.

The invention claimed is:

1. A method for manufacturing a flame tube for a turbomachine, the said flame tube extending about an axis and comprising an annular radially internal wall and an annular radially external wall, connected to each other by an end wall, the internal wall, the external wall and the end wall defining an internal volume, at least one part of the said end wall forming a double wall comprising a first part and a second part connected to each other and spaced apart from each other so as to delimit a flow channel for a flow of cooling air exiting into the said internal volume, the said flow channel comprising at least one air-inlet opening, the first and second parts of the double wall being connected by connecting zones or bridges extending into the flow channel for the cooling-air flow, the connecting areas or bridges being arranged in the form of at least one circumferentially extending row, the method comprising:
   manufacturing the said flame tube by additive manufacturing.

2. The method according to claim 1, wherein the flame tube is manufactured by sintering or selective melting of powder.

3. The method according to claim 1, wherein at least one connecting area or bridge comprises at least one frustoconical area or flared area.

4. The method according to claim 3, wherein the frustoconical area or flared area flares out from the first part towards the second part of the double wall.

5. The method according to claim 3, wherein at least one connecting area or bridge comprises at least a first conical or flared area, located on the side of the first part and a second conical area or flared area, located on the side of the second part, the second conical area or flared area having a larger flare angle than the flare angle of the first conical area or flared area.

6. The method according to claim 1, wherein the first part of the double wall comprises multi-perforations opening into the flow channel of the cooling-air flow, the said multi-perforations forming air-inlet openings.

7. The method according to claim 1, wherein the flame tube is manufactured by stacking layers, the stacking direction of the layers being parallel to the axis of the flame tube.

8. The method according to claim 1, wherein the flame tube is made of a cobalt-based or nickel-based alloy.

9. The method according to claim 2, wherein the powder is sintered or selectively melted by a laser beam or electron beam.

10. A flame tube obtained by the method of claim 1.

11. A method for manufacturing a flame tube for a turbomachine, the said flame tube extending about an axis and comprising an annular radially internal wall and an annular radially external wall, connected to each other by an end wall, the internal wall, the external wall and the end wall defining an internal volume, at least one part of the said end wall forming a double wall comprising a first part and a second part connected to each other and spaced apart from each other so as to delimit a flow channel for a flow of cooling air exiting into the said internal volume, the said flow channel comprising at least one air-inlet opening, the first and second parts of the double wall being connected by connecting zones or bridges extending into the flow channel for the cooling-air flow, at least one connecting area or bridge comprising at least a first conical or flared area, located on the side of the first part and a second conical area or flared area, located on the side of the second part, the second conical area or flared area having a larger flare angle than the flare angle of the first conical area or flared area the method comprising:
   manufacturing the said flame tube by additive manufacturing.

12. A method for manufacturing a flame tube for a turbomachine, the said flame tube extending about an axis and comprising an annular radially internal wall and an annular radially external wall, connected to each other by an end wall, the internal wall, the external wall and the end wall defining an internal volume, at least one part of the said end wall forming a double wall comprising a first part and a second part connected to each other and spaced apart from each other so as to delimit a flow channel for a flow of cooling air exiting into the said internal volume, the said flow channel comprising at least one air-inlet opening, the first and second parts of the double wall being connected by connecting zones or bridges extending into the flow channel for the cooling-air flow, the connecting areas or bridges being arranged in the form of at least one circumferentially extending row, the method comprising:

manufacturing the said flame tube by additive manufacturing, the flame tube being manufactured by stacking layers, the stacking direction of the layers being parallel to the axis of the flame tube.

* * * * *